3,749,585
PROCESS FOR PREPARING CITRUS PUREE
Robert R. Cruse and Bruce J. Lime, Weslaco, Tex., assignors to the United States of America as represented by the Secretary of Agriculture
No Drawing. Filed May 5, 1971, Ser. No. 140,618
Int. Cl. A23l 1/06, 3/00
U.S. Cl. 99—100                         1 Claim

ABSTRACT OF THE DISCLOSURE

A process for preparing grapefruit puree from the whole fruit is disclosed. The whole fruit is coarsely cut after blanching, comminuted, then finely comminuted and homogenized to a 0.005 inch particle size, then the bitter principles are removed by enzymatic hydrolysis.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the preparation of citrus puree. More specifically, it relates to the preparation of a puree utilizing the whole fruit. Still more specifically, it is concerned with the comminution of the whole grapefruit, with concommitant separation and rejection of seeds, scaly portions of the peel and tougher portions of the rag. Prior, or concommitant deoiling, as described in our co-pending application for a similar process utilizing oranges, has been shown to be unnecessary with grapefruit, since the peel oil content of the whole fruit is sufficiently low to alleviate the unpalatability associated with high concentrations of the oil.

Current utilization of citrus fruit, in the manufacture of single strength juice, and of concentrate for freezing and subsequent reconstitution, is of the order of approximately 55%. Further, much of the edible interior pulp is downgraded with seeds, peel and rag in subsequent drying of the pulp wastes for customary use as cattle feed. The necessity of having to dry large quantities of pulp containing high percentages of moisture requires considerable process heat and large drying facilities in order to avoid a more serious waste disposal problem.

Increased utilization of citrus fruit has been proposed by Braverman and Levi (Food Technology 14(2): 106–9 [1960]) in a process in which a pressurized vessel is employed to soften the fruit tissue prior to comminution. The fruit are charged to the cooker and placed under a pressure of 50 p.s.i.g. for 3 min. The pressure is quickly released and the fruit are expelled and partially broken up. The pulp is further comminuted by known methods. In addition to requiring expensive pressure equipment, this process is, for practical purposes, a batch process. Such processes are considered undesirable in the U.S. citrus processing industry. Likewise, over and above the initial cost, the use of autoclaves or other pressure equipment is avoided for reasons of operating expense and safety.

Haman, in U.S. Pat. No. 2,935,407, produces a citrus whole fruit puree; however, his process either incorporates the seeds and rag into the finished puree, or else an additional separation or coring step is required. Incorporation of seeds and rag into whole fruit puree has been shown, in our laboratory, to impart a bitter and/or a "mealy" texture to the puree, which, when further processed or utilized, particularly in the preparation of beverages, gives such beverage an off-flavor, as well as an undesirable physical effect in the mouth and lips. Separate removal of seeds adds costs to the finished product in the form of additional processing time and labor, plus losses of desirable portions of the fruit, particularly if coring is used.

It is an object of this invention to provide a continuous process for the production of finely comminuted citrus pulp or puree.

Another object is to provide a process dispensing with the use of pressurized processing vessels entirely.

Yet another object is to provide a process which will utilize at least 85% of the whole fruit in the final product.

Still another object is to provide a process in which flavonoids present in citrus pulp and peel, notably naringin in grapefruit, are concommitantly treated enzymatically to destroy their bitter taste properties.

Another object is to provide a process in which seeds, scaly portions of peel, and tougher portions of the rag present in citrus fruit may be concommitantly separated as an integral part of a continuous operation.

We have found that whole citrus fruit can be blanched in boiling water at atmospheric pressure to soften the tissues; partially comminuted in a Fitzpatrick comminuting machine operating at slow speed (about 625 r.p.m.) with a ½ inch screen; further comminuted with concommitant separation of seeds, tough scaly peel, and tough rag in a paddle finisher, with 0.060" screens, and operating at 1725 r.p.m.; and finally pureed in a homogenizer to reduce the solid pulp particles to 0.005" diameter or less. Alternatively, the whole fruit can be continuously comminuted with concommitant separation of seeds; tough, scaly peel; and tough rag, by passing the blanched fruit through a screw-type food finisher, 3 times, using a 0.062"–0.125" (1/16"–1/8") conical screen, and subsequently homogenizing as above. The bitter principles present, especially naringin, are hydrolyzed after homogenization with an enzyme such as naringinase, which will specifically hydrolyze and thus neutralize such bitter principles. The resulting puree is suitable as a base for citrus beverages, glazes, sauces, and other food applications utilizing citrus flavor. The puree lends itself to many applications in the baking and dairy industries. The puree may be preserved by frozen storage, or pasteurization and subsequent canning while hot.

The following examples are illustrative of the invention, but are not to be construed as limiting it thereby.

EXAMPLE 1

A field box of redblush grapefruit (about 90 lbs. of fruit) was blanched 10 minutes in boiling water; the pulp in the center of the fruit had an average temperature, after blanching, of 150°–155° F. The blanched fruit were coarsely cut up while still hot, and passed through a screw finisher with a conical screen having 0.125" openings and a central exit for rejecting seeds and other portions of the pulp not expressed through the screen. The pulp was well-mixed and passed through a 2-stage laboratory homogenizer. The homogenized puree weighed 80 pounds, which represents a utilization of 88.9% of the fruit.

EXAMPLE 2

A field box of redblush grapefruit was treated as in Example 1, except that the finisher screen had 0.062"

openings. During the final homogenization, 0.05% naringinase, based on the weight of the fruit taken, was added in portions to the pulp in the feed hopper of the homogenizer. The homogenized puree was placed in a kettle supported in a hot water bath and maintained at 115°–125° F. until the bitterness had reached an acceptable level. This required 3 hours. The debittered puree was packaged and stored at −10° F.

An excellent beverage was prepared from the above pulp as follows:

|   | Parts by weight |
|---|---|
| Grapefruit puree | 100 |
| Sugar | 125 |
| Six-fold lemon concentrate | 25 |
| Water to 1000. | |

Analysis of this beverage gave the following results:

| | |
|---|---|
| Brix ° | 14.3 |
| Acid, percent | 0.75 |
| pH | 2.9 |
| Suspended solids, percent | 9 |
| Cloud | 40.3 |
| "Recoverable" oil | 0.0104 |

EXAMPLE 3

Eighty pounds of field run redblush grapefruit were blanched 10 minutes in boiling water at 212° F., in two batches. The fruit were passed through a Fitzpatrick Model D comminuting machine operating at 625 r.p.m. and fitted with a screen having ½" openings. This combination of speed and screen openings rapidly comminuted the fruit without significantly cracking or attritioning the seeds. The combined ground grapefruit pulp was passed through a Langsenkamp laboratory model paddle finisher, fitted with 0.060" screens, and set to operate at 1725 r.p.m. This operation separated seeds and tough and scaly portions of peel and rag continuously and concomitantly with further comminution. The seeds were rejected intact, and the rejected peel and rag (total rejected weight 11–15% of the starting weight of fruit) was in pieces small enough to dry and use for livestock feed without further milling or comminution. The screened fine pulp was passed through a Manton-Gaulin Type 25 CGB laboratory homogenizer, first stage setting, 1500 p.s.i.g.; second stage, 3000 p.s.i.g. The homogenized puree was treated 3 hours at 45°–50° C. with 0.05% naringinase (Kumitanase) prior to pasteurization. The puree was heated to 195° F. using a tubular pasteurizer, and hot canned. Storage at 40° F. showed satisfactory storage stability over a 9-month period.

EXAMPLE 4

About 20 redblush grapefruit were passed through the Fitzpatrick comminuting machine, set to operate at the next higher speed than the speed of Example 3, viz., 1150 r.p.m. The seeds of the fruit were badly cracked and partially comminuted.

We claim:
1. A process for preparing a finely-comminuted grapefruit puree, essentially free of bitter principles, from the whole grapefruit, comprising:
  (a) blanching the whole grapefruit in boiling water at atmospheric pressure to soften the tissues;
  (b) coarsely comminuting the blanched grapefruit from step (a) while still hot to a particle size of about 0.50 inch in diameter without essentially damaging the seeds;
  (c) further comminuting the grapefruit from step (b) to a particle size of about 0.060 inch in diameter while concomitantly separating the seeds, tough scaly peel, and tough rag;
  (d) homogenizing the comminuted grapefruit from step (c) to a particle size not exceeding about .005 inch in diameter to obtain a homogenized grapefruit puree constituting at least 85% by weight of the starting whole grapefruit;
  (e) treating the homogenized grapefruit puree from step (d) without about 0.05% naringinase enzyme, based on the weight of the grapefruit taken, for about 3 hours at about from 45° C. to 50° C. to hydrolyze the naringin present, which essentially constitutes the bitter principles of the grapefruit, thereby to neutralize and thus remove said bitter principles;
  (f) pasteurizing the resulting grapefruit puree from step (e) at about 195° F.;
  (g) hot canning the pasteurized puree; and
  (h) storing the canned puree.

References Cited
UNITED STATES PATENTS

| | | | |
|---|---|---|---|
| 3,031,307 | 4/1962 | Blahimoe | 99—103 |
| 3,037,975 | 6/1962 | Cohn | 99—105 |
| 2,283,290 | 5/1942 | Savage | 99—103 |
| 2,752,253 | 6/1956 | Talbert | 99—103 |
| 2,289,851 | 7/1942 | Moxay | 99—103 |

OTHER REFERENCES

Proceedings of the 1968 Conference on Citrus Chemistry ARS-72-73, May 1969, p. 17.

NORMAN YUDKOFF, Primary Examiner

U.S. Cl. X.R.

99—103, 106, 214, 215